(12) United States Patent  
Ok

(10) Patent No.: US 12,370,426 B2  
(45) Date of Patent: Jul. 29, 2025

(54) HYBRID GOLF SYSTEM, CONTROL METHOD OF MOBILE TERMINAL USED TO THE SAME AND METHOD FOR LOCATING GOLF BALL AT BALL POSITION ON FIELD USING USER'S MOBILE TERMINAL IN HYBRID GOLF SYSTEM

(71) Applicant: GOLFZON CO., LTD., Seoul (KR)

(72) Inventor: Jae Yoon Ok, Goyang-si (KR)

(73) Assignee: GOLFZON CO., LTD., Seoul (KR)

( * ) Notice: Subject to any disclaimer, the term of this patent is extended or adjusted under 35 U.S.C. 154(b) by 257 days.

(21) Appl. No.: 18/275,439

(22) PCT Filed: Feb. 9, 2022

(86) PCT No.: PCT/KR2022/001957  
§ 371 (c)(1),  
(2) Date: Aug. 2, 2023

(87) PCT Pub. No.: WO2022/173210  
PCT Pub. Date: Aug. 18, 2022

(65) Prior Publication Data  
US 2024/0100407 A1 Mar. 28, 2024

(30) Foreign Application Priority Data  
Feb. 10, 2021 (KR) .................... 10-2021-0019055

(51) Int. Cl.  
*A63B 67/02* (2006.01)  
*A63B 24/00* (2006.01)  
*A63B 71/06* (2006.01)

(52) U.S. Cl.  
CPC .......... *A63B 67/02* (2013.01); *A63B 24/0021* (2013.01); *A63B 71/0622* (2013.01);  
(Continued)

(58) Field of Classification Search  
None  
See application file for complete search history.

(56) References Cited

U.S. PATENT DOCUMENTS 10,682,569 B1 * 6/2020 Vale .................... A63B 24/0021  
11,013,976 B2 * 5/2021 Korpach ............... A63F 13/812  
(Continued)

FOREIGN PATENT DOCUMENTS

KR 10-2002-0092266 A 12/2002  
KR 10-2012-0009933 A 2/2012  
(Continued)

OTHER PUBLICATIONS

International Search Report for PCT/KR2022/001957 mailed May 27, 2022 from Korean Intellectual Property Office.

*Primary Examiner* — Tramar Harper  
(74) *Attorney, Agent, or Firm* — Revolution IP, PLLC

(57) ABSTRACT

It is an object of the present invention to provide a hybrid golf system, a control method of a mobile terminal used to the same and a method for locating a golf ball at a ball position on a field using a user's mobile terminal in the hybrid golf system that allows the user to find a golf ball position on an actual field corresponding to a virtual ball position on a virtual golf course using the user's mobile terminal without additional devices for pointing the golf ball position.

8 Claims, 8 Drawing Sheets

(a)

(b)

(52) U.S. Cl.
CPC ............... *A63B 2024/0028* (2013.01); *A63B 2071/0638* (2013.01); *A63B 2220/12* (2013.01); *A63B 2220/806* (2013.01)

(56) References Cited

U.S. PATENT DOCUMENTS

| | | | |
|---|---|---|---|
| 2014/0274240 A1* | 9/2014 | Meadows | A63F 13/216 |
| | | | 463/3 |
| 2015/0051022 A1 | 2/2015 | Shon | |
| 2019/0022509 A1* | 1/2019 | Lee | A63B 71/0622 |
| 2019/0255407 A1* | 8/2019 | Rivas | A63F 13/812 |
| 2020/0384343 A1* | 12/2020 | Vollbrecht | A63B 24/0003 |
| 2021/0379445 A1* | 12/2021 | Korpach | A63F 13/537 |
| 2023/0032604 A1* | 2/2023 | Lee | A63B 24/0021 |

FOREIGN PATENT DOCUMENTS

| | | | | |
|---|---|---|---|---|
| KR | 10-2012-0036155 A | 4/2012 | | |
| KR | 10-2012-0036156 A | 4/2012 | | |
| KR | 10-1194269 B1 | 10/2012 | | |
| KR | 10-2013-0030536 A | 3/2013 | | |
| KR | 10-1425382 B1 | 8/2014 | | |
| KR | 10-1555840 A | 9/2015 | | |
| KR | 101555840 B1 * | 9/2015 | ............ | G01S 13/06 |
| KR | 20160051346 A * | 5/2016 | ............ | A63B 69/36 |
| KR | 10-1703859 B1 | 2/2017 | | |
| KR | 20170012615 A * | 2/2017 | ............ | A63B 69/36 |
| WO | WO-2021148560 A1 * | 7/2021 | ............ | G01S 13/88 |

\* cited by examiner (a)

(b)

(a)

(b)

HYBRID GOLF SYSTEM, CONTROL METHOD OF MOBILE TERMINAL USED TO THE SAME AND METHOD FOR LOCATING GOLF BALL AT BALL POSITION ON FIELD USING USER'S MOBILE TERMINAL IN HYBRID GOLF SYSTEM

TECHNICAL FIELD

The present invention is related to a hybrid golf system, a control method of a mobile terminal used to the same and a method for locating a golf ball at a ball position on a field using a user's mobile terminal in the hybrid golf system that in the process of making a virtual golf play using a virtual golf simulation device, if a ball is settled on or around a green on an image of the virtual golf simulation device, allows the user to move to an actual field to take an approach shot around an actual green on an actual field or to putt on the actual green.

BACKGROUND ART

With the recent upsurge in the number of golfers, a so-called screen golf system, which enables a golfer to practice golf and to play a round of virtual golf using a virtual golf simulation apparatus, has gained popularity.

The screen golf system is a system that senses the velocity and direction of a golf ball that a golfer hits onto a screen installed indoors to display a virtual golf course and displays the progress of the golf ball on the screen. The screen golf systems are continuing to evolve in terms of enabling users to feel the same realism that the user feels when playing a round of golf on an actual golf course, which exceeds the level of enjoyment of a golf game that is simply played indoors.

Since a conventional screen golf system implements a simulated image of a virtual golf course and a ball trajectory on the virtual golf course only through a screen installed in front of a user hitting the ball, there is a limit for the user to feel a sense of realism such as playing a golf round at an actual golf course.

To overcome this limitation, so-called a hybrid golf system has been appeared that can be embodied in much smaller space than the actual golf course while providing reality such as playing golf rounds on the actual golf course.

The hybrid golf system combines an actual field that can play actual golf such as a short game with a screen golf system, allowing some of the golf play on a hole to be played on the virtual golf course implemented in the screen golf system, and the rest to be played by playing actual golf on the actual field.

For example, in the case of par 4 hole, a tee shot and a second shot are conducted through the virtual golf simulation on the virtual golf course through the screen golf system, and third shot and putting are allowed to proceed the same as the user moves to the actual field and plays on the actual golf course.

Prior art documents related to the hybrid golf systems include KR10-2013-0030536, KR10-2012-0036155, KR10-2012-0036156, and KR10-2012-0009933.

In such a hybrid golf system, the system accurately specifies a golf ball position on an field corresponding to a position where the user's virtual ball is seated on the virtual golf course so that the user can take a golf shot at the corresponding golf ball position on the field.

Conventionally, a laser pointer was mainly used to specify the golf ball position on the field corresponding to the virtual ball position on the virtual golf course.

That is, a hybrid golf system according to a prior art calculates the golf ball position on the field corresponding to the user's virtual ball position on the virtual golf course, and a laser pointer installed around the field indicates the golf ball position on the field. Accordingly, the user can place a golf ball at the position indicated by the laser pointer and take a golf shot.

However, there are many problems with the method of indicating the golf ball position using the laser pointer as described above.

In order for the laser pointer to indicate the exact golf ball position, the size of the field must be reduced or a lot of laser pointers must be installed, which has a problem of reducing the realism of golf play on the field.

If the field is formed widely, a number of laser pointers must be installed around the field to effectively indicate the golf ball position, and such laser pointers can interfere when playing the field.

In addition, a separate control module must be equipped to control the many laser pointers, the installation cost increases significantly, and the maintenance of the laser pointers is expensive.

Prior Art Documents related to the present invention are as follows:
Korean Patent Publication No. 10-2013-0030536
Korean Patent Publication No. 10-2012-0036155
Korean Patent Publication No. 10-2012-0036156
Korean Patent Publication No. 10-2012-0009933

DISCLOSURE

Technical Problem

The present invention has been made in view of the above problems, and it is an object of the present invention to provide a hybrid golf system, a control method of a mobile terminal used to the same and a method for locating a golf ball at a ball position on a field using a user's mobile terminal in the hybrid golf system that allows the user to find a golf ball position on an actual field corresponding to a virtual ball position on a virtual golf course using the user's mobile terminal without additional devices for pointing the golf ball position.

Technical Solution

In accordance with an aspect of the present invention, the above and other objects can be accomplished by the provision of a method for locating a golf ball at a ball position on a field using a user's mobile terminal in a hybrid golf system including a field provided for the user to play golf and a screen golf module provided on one side of the field to play golf on a virtual golf course, the method comprising: transmitting by a simulator in the screen golf module, information on the user's ball position on the virtual golf course according to the golf play in the screen golf module to the user's mobile terminal; displaying a ball position indication indicating the ball position on the field corresponding to the user's ball position on the virtual golf course on the augmented reality image executed by the user's mobile terminal; and locating an object of the golf ball on the ball position indication on the augmented reality image of the user's mobile terminal so that a ball ready on the field occurs, indicating that the golf ball is located at the user's ball position on the field.

The transmitting information to the user's mobile terminal includes transmitting ball position information on the virtual golf course of each of a plurality of users to each of the mobile terminals of the plurality of the users, and wherein the displaying the ball position on the field includes: calculating by each of the mobile terminals, ball positions on the field corresponding to each of the users' ball positions on the virtual golf course; providing by each of the users' mobile terminals, a shot guide to each of the users when each of the users becomes a shot order of each user; and displaying a ball position indication indicating the user's ball position on the field on the augmented reality image of the mobile terminal provided the shot guide.

The displaying the ball position on the field includes: calculating by the mobile terminals, the ball position on the field corresponding to the users' ball positions on the virtual golf course; and displaying a ball position indication indicating the ball position on the field on the augmented reality image executed by the mobile terminal using position information calculated by a GPS module of the mobile terminal and information of the ball position on the field, The displaying the ball position on the field includes displaying the ball position indication on the augmented reality image larger as the distance between the ball position on the field and the mobile terminal's position is further, as the user holds the mobile terminal and approaches the ball position on the field, the ball position indication on the augmented reality image is gradually reduced.

The locating an object of the golf ball on the ball position indication includes: capturing the golf ball placed at an arbitrary position on the field in an angle of view of a camera of the mobile terminal in the state of displaying the ball position indication indicating the ball position on the field on the augmented reality of the mobile terminal; recognizing an object of the captured golf ball by the mobile terminal; detecting by the mobile terminal, whether the golf ball object is located on the ball position indication in the augmented reality image as the user moves the golf ball; and occurring a ball ready on the field when the golf ball object is located on the ball position indication in the augmented reality image.

In accordance with another aspect of the present invention, there is provided a control method of a mobile terminal used to a hybrid golf system including a field provided for the user to play golf and a screen golf module provided on one side of the field to play golf on a virtual golf course, the control method comprising: receiving a user's ball position on a virtual golf course according to the user's golf play in the screen golf module; calculating a ball position on the field corresponding to the received ball position on the virtual golf course; executing an augmented reality and displaying a ball position indication indicating the ball position on the field in the augmented reality image; and recognizing a golf ball on the field as an object of the golf ball, and occurring a ball ready on the field that determines that the golf ball is located on the ball position on the field when the recognized golf ball object is located on the ball position indication displayed in the augmented reality image.

The displaying the ball position indication in the augmented reality image includes: providing a shot guide when the user owned the mobile terminal becomes a shot order; and displaying the ball position indication indicating the ball position on the field on the augmented reality image executed by the mobile terminal using position information calculated by a GPS module of the mobile terminal and information of the ball position on the field.

In accordance with another aspect of the present invention, there is provided a hybrid golf system comprising: a screen golf module provided on one side of a field where a user can play golf and allowing the user to play golf on a virtual golf course; a simulator provided in the screen golf module and implementing an image of a virtual golf simulation on the virtual golf course; and a mobile terminal that is configured to: receive a user's ball position on the virtual golf course according to the user's golf play in the screen golf module, calculate a ball position on the field corresponding to the received ball position on the virtual golf course, execute an augmented reality and displaying a ball position indication indicating the ball position on the field in the augmented reality image, recognize a golf ball on the field as an object of the golf ball, and occur a ball ready on the field that determines that the golf ball is located on the ball position on the field when the recognized golf ball object is located on the ball position indication displayed in the augmented reality image.

Advantageous Effects

A hybrid golf system, a control method of a mobile terminal used to the same and a method for locating a golf ball at a ball position on a field using a user's mobile terminal in the hybrid golf system according to the present invention have effects in that it is possible to allow the user to find a golf ball position on an actual field corresponding to a virtual ball position on a virtual golf course using the user's mobile terminal without additional devices for pointing the golf ball position.

BEST MODE

A hybrid golf system, a control method of a mobile terminal used to the same and a method for locating a golf ball at a ball position on a field using a user's mobile terminal in the hybrid golf system according to the present invention will be described in detail with reference to the accompanying drawings.

First, the construction of the hybrid golf system according to an embodiment of the present invention will be described with reference to FIGS. 1 and 2.

Figure 1:
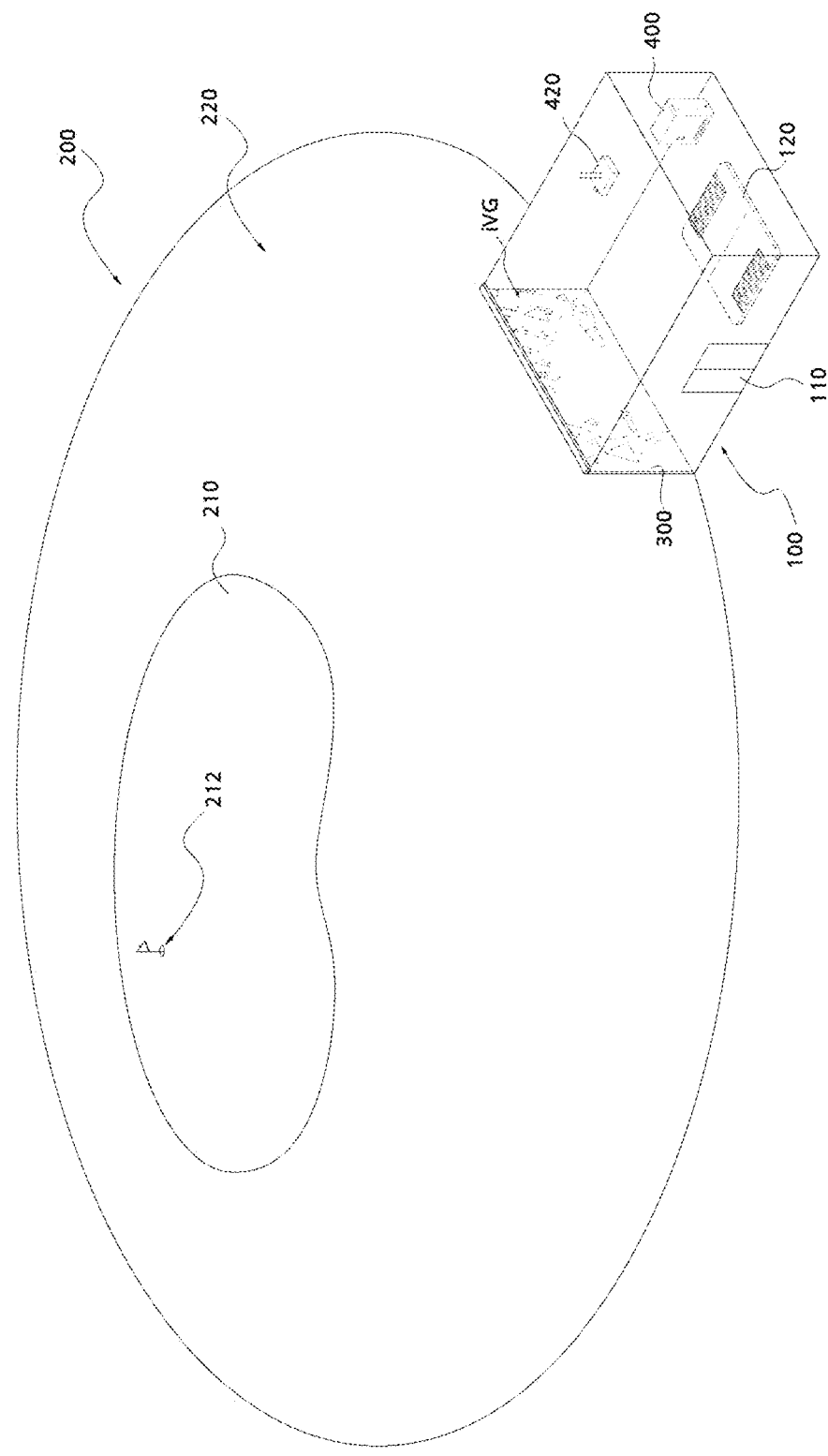
FIG. 1 shows a hybrid golf system according to an embodiment of the present invention.
Figure 2:
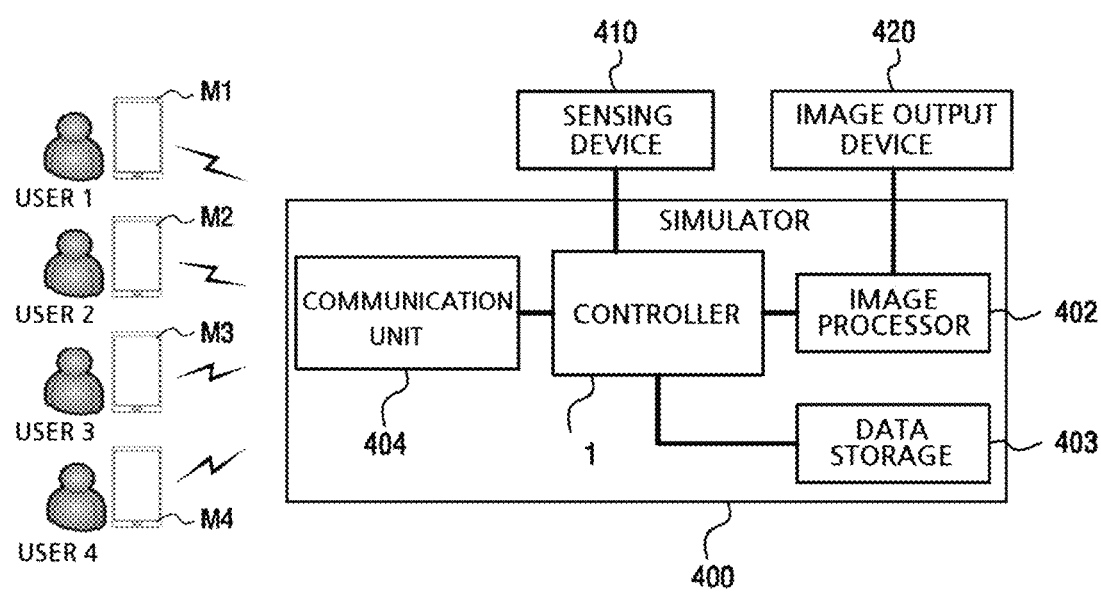
FIG. 2 is a block diagram showing a control system of the hybrid golf system shown in FIG. 1.

FIG. 1 shows a hybrid golf system according to an embodiment of the present invention, and FIG. 2 is a block diagram showing a control system of the hybrid golf system shown in FIG. 1.

As shown in FIG. 1, the hybrid golf system according to an embodiment of the present invention may be configured with a field 200 provided for the user to play golf in real and a screen golf module 100 provided with a virtual golf simulation device for the user to play golf on a virtual golf course.

The screen golf module 100 includes a construction related to a conventional screen golf system. Specifically, the screen golf module 100 includes a virtual golf simulation device in which a virtual golf course image is projected on the front screen, when the user hits the ball on a swing stage 120 toward the screen, the sensing device senses the moving ball and a simulation image in which the virtual ball moves on the virtual golf course is provided.

The screen golf module 100 may be provided in the form of a box or a booth with an entrance 110 on one side, and may be in a form in which all walls are closed or some of the walls may be open.

The screen golf module 100 may be configured to include a screen shutter 300 on a wall facing the field 200.

The screen shutter 300 is an element that projects an image of a virtual golf course output by an image output device 420 (e.g., a beam projector, etc.) inside the screen golf module 100 and a simulation image iVG on the virtual golf course.

Meanwhile, the field 200 may be configured to form a part of the entirety of a hole of the actual golf course, and may be formed to include a green 210 and a hole-cup 212 as shown in FIG. 1. Wherein the field 200 may be provided so that the user can approach and putt, including surrounding areas 220 such as a fairway, a rough, and a bunker around the green 210.

In the hybrid golf system according to an embodiment of the present invention, the user performs some golf play through the virtual golf course in the screen golf module 100 and the rest of the golf play is performed in the actual field 200.

In the case of golf play on a par 4 hole, a virtual golf play is performed on the virtual golf course of the par 4 hole in the screen golf module 100, and golf play on the remaining part of the par 4 hole is performed directly on the actual field 200. Wherein the virtual golf play is golf play in which the user takes a golf shot toward the screen shutter at the swing stage and the sensing device senses the hit ball and the simulation of a virtual ball corresponding to the hit ball performs.

For example, the tee shot and the second shot in the par 4 hole are played as the virtual golf play on the virtual golf course in the screen golf module 100, and the third shot (approach shots) and putting can allow the user to move from the screen golf module 100 to the actual field 200 and actually proceed with golf play on the actual field 200.

The hybrid golf system according to an embodiment of the present invention uses mobile terminals owned by users. Wherein, the mobile terminal may be a personal mobile communication terminal such as each user's smartphone or tablet PC, or may be a dedicated terminal provided separately to each user using the hybrid golf system. If the above mobile terminal is a dedicated terminal described above, it is preferable to be a terminal that includes configurations such as a GPS module and a camera and can run an application such as a smartphone or a tablet PC.

As described in FIG. 2, it is preferable for each user to play golf with his or her mobile terminal M1, M2, M3 or M4, and each mobile terminal M1, M2, M3 or M4 may be configured to communicate with the controller 401 through wireless communication with the communication unit 404 of the simulator 400.

It is preferable that user's mobile terminals M1, M2, M3 and M4 execute applications for using the hybrid golf system according to an embodiment of the present invention and set up wireless communication with the simulator's communication unit 404 through login by each user.

As shown in FIGS. 1 and 2, the simulator 400 provided inside the screen golf module 100 includes a controller 401, an image processor 402, and a data storage 403. The controller 401 may be configured to receive sensing data from the sensing device 410, and the communicate with each user's mobile terminal M1, M2, M3, M4 through the communication unit 404.

Figure 3:
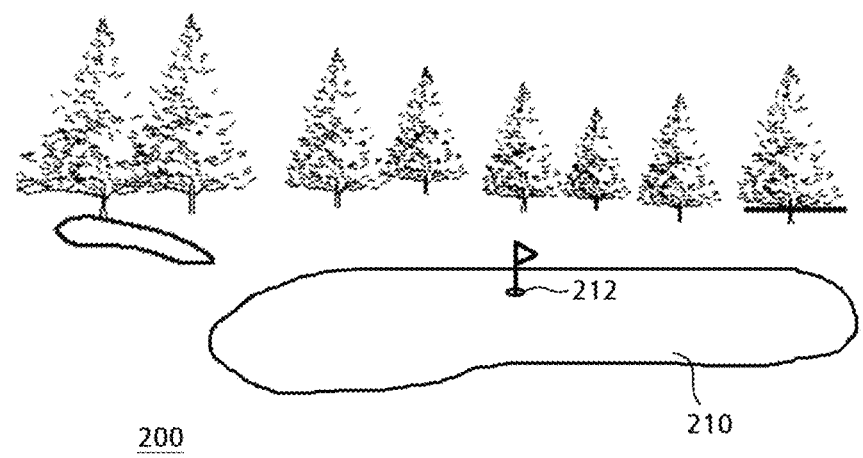
FIG. 3 shows a user playing virtual golf while watching an image projected on a screen shutter inside the screen golf module of the hybrid golf system shown in FIG. 1.
Figure 3:
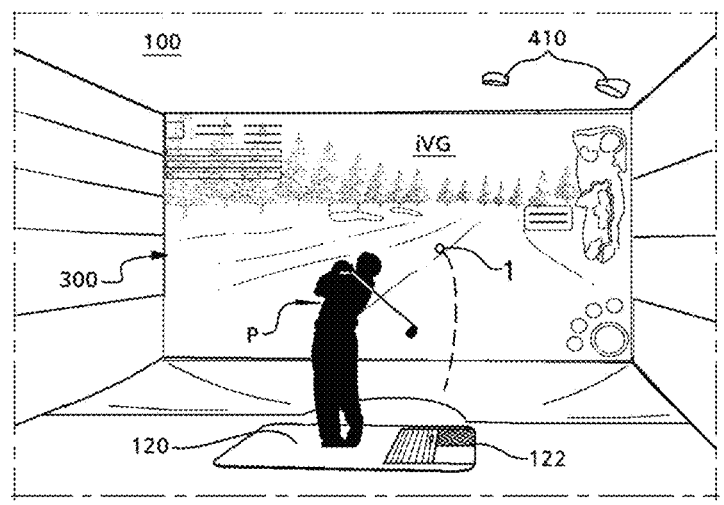

FIG. 3 shows that the user U plays virtual golf while looking at the image iVG projected on the screen 300 inside the screen golf module 100 shown in FIG. 1.

The sensing device 410 may be embodied as a camera-based device that senses a movement of at least one of a golf club and a ball according to a golf swing of a user. The sensing device 410 captures and collects images of the ball 1 moving as the user U on a swing stage 120 hits the ball placed on a golf mat 122 within the camera's angle of view, performs image processing and analysis on the collected image, calculates sensing information including flight parameters for the movement of the ball 1 and delivers sensing information to the controller 401.

A manipulation device (not shown) may be further provided as a means of manipulating the user to set the environment of the virtual golf simulation or to adjust the aiming during the virtual golf round process.

The data storage 403 stores all data necessary for the image implementation of the virtual golf simulation, and stores data on the virtual golf course and topographic information of the virtual golf course.

The data storage 403 may be configured to store all kinds of data on the virtual golf course, or may be configured to receive and temporarily store various data on the virtual golf course from a server (not shown) through a network.

The image processor 402 performs data processing to implement an image related to the virtual golf course on the screen shutter using data on the virtual golf course stored in the data storage 403, and performs data processing so that the trajectory of the ball hit by the user is simulated on the virtual golf course.

The image information processed by the image processor 402 is projected onto the screen 300 through the image output device 420 (e.g., a projector), allowing the user U to see the image iVG projected on the screen 300.

The image processor 402 may be implemented as a modular component that performs an image processing function in one independent device, or as an independent device itself.

The controller 401 is in charge of control for all processes for virtual golf simulation. The controller 401 may perform operations and controls to simulate the movement of a virtual ball on a virtual golf course based on sensing information on the movement of the ball extracted according to the sensing result of the sensing device 410 and physics engine. Based on these operations and controls, the controller implements an image iVG in which the virtual ball is simulated on the virtual golf course according to the sensing result of the sensing device and the physics engine.

The controller 401 determines whether a requirement for beginning the field play in the actual field is satisfied in the virtual golf play process in the virtual golf course. If the controller 401 determines that the requirement for beginning the field play have been met, the controller may guide the user to move to the field 200 and perform the field play through video/audio through the screen image iVG.

When the field play begins, the controller 401 of the simulator 400 may transmit a signal for field play beginning to each user's mobile terminal M1, M2, M3, M4 and transmit various information (e.g., map information on a virtual golf course, ball location information, score information, etc.) to each user's mobile terminal.

When a plurality of users play golf round together, field play as described above can be begun if all users' balls (i.e., virtual balls on the image) are located within a predetermined range on the virtual golf course (e.g., a predetermined radius range based on the hole cup on the green of the virtual golf course).

When field play begins, each of the users' mobile terminals M1, M2, M3 and M4 receive ball position information on each user's ball position on the virtual golf course from the communication unit 404 of the simulator 400 and calculate the ball position on the field 200 corresponding to the ball position on the virtual golf course.

Figure 4:
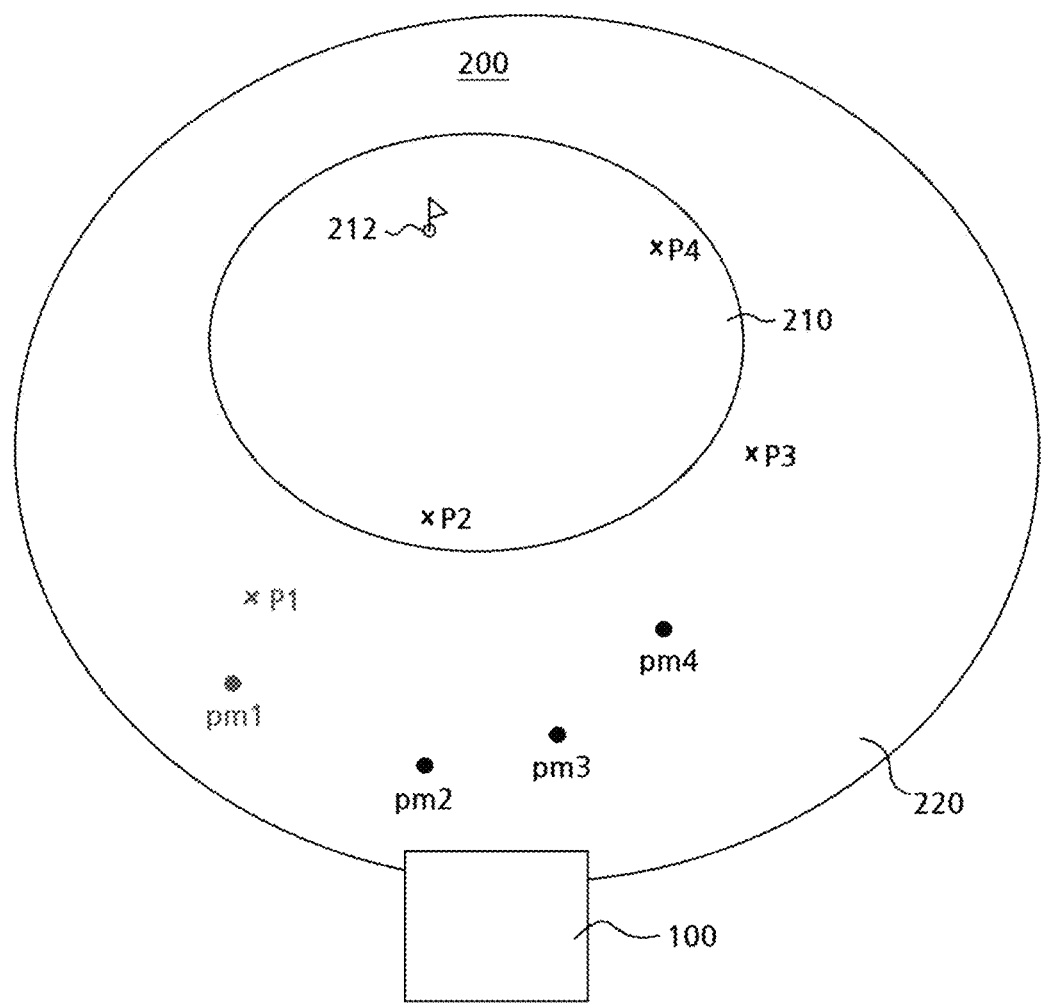
FIG. 4 shows an example of ball positions on a field calculated by each user's mobile terminal in response to each user's virtual ball position on a virtual golf course when four users play a golf round together through a hybrid golf system according to an embodiment of the present invention.

FIG. 4 shows an example of the ball positions P1, P2, P3, P4 on the field 200 calculated by each of the users' mobile terminals M1, M2, M3 and M4 corresponding to each of the users' ball positions on the virtual golf course when four users play a golf round together.

Each of the users' mobile terminals M1, M2, M3, and M4 store coordinate information of each of the users' ball positions P1, P2, P3, and P4 on the field 200 as a coordinate space.

Each of the users' mobile terminals M1, M2, M3, and M4 having a GPS module can calculate each user's position information on the coordinate space, and FIG. 4 shows each of the positions pm1, pm2, pm3 and pm4 of the mobile terminals M1, M2, M3, and M4. That is, pm1 represents the position of the M1 mobile terminal, pm2 represents the position of the M2 mobile terminal, pm3 represents the position of the M3 mobile terminal, and pm4 represents the position of the M4 mobile terminal, respectively.

As shown in FIG. 4, based on information on each of the ball positions P1, P2, P3, and P4 and information on the positions pm1, pm2, pm3, and pm4 of each of the mobile terminals on the coordinate space including the field 200, each mobile terminal may display each ball position P1, P2, P3, and P4 in an augmented reality image.

Each mobile terminal can determine the shot order through distance information of each ball position P1, P2, P3, P4 on the field 200 from the hole cup 212, and provide each user with a shot guide according to the shot order. The mobile terminal that has provided the shot guide may display the ball position on the field of each user in the augmented reality image.

In the example shown in FIG. 4, the shot order is P1→P3→P2→P4. Since the first turn is the user of the M1 mobile terminal, the M1 mobile terminal can provide a shot guide and execute an augmented reality image to display the P1 position which is the ball position on the field of the M1 terminal's user.

Wherein, other users' mobile terminals may be in a shot waiting state, and in the shot waiting state, the ball position may not be displayed or augmented reality images may not be executed.

Figure 5:
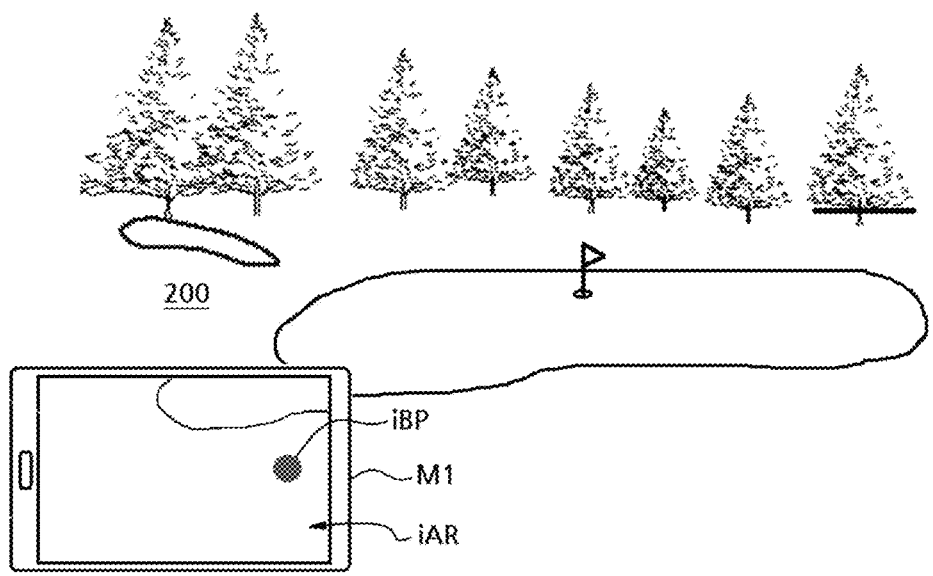
FIG. 5 and FIG. 6 show an example of a process in which a user places a golf ball at a ball position on the field using the user's mobile terminal in the hybrid golf system according to an embodiment of the present invention.
Figure 5:
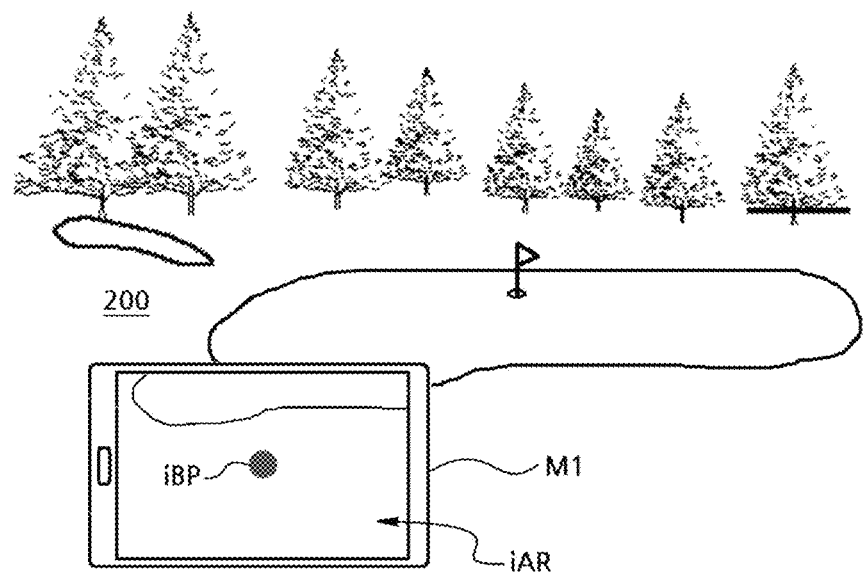

FIG. 5 shows the case where the M1 mobile terminal executes an augmented reality image and displays the P1 position, which is the ball position on the field of the M1 terminal's user.

As shown in FIGS. 5(a) and 5(b), when the mobile terminal M1 executes the augmented reality image iAR, the camera of the M1 mobile terminal takes an image at a predetermined angle of view and displays it on the display screen, where the M1 mobile terminal displays the ball-position indication iBP corresponding to the user's ball position on the field on the augmented reality image iAR.

The ball position indication iBP on the augmented reality image iAR indicates the position on the coordinate space based on the location of the mobile terminal, and since the ball position is fixed on the coordinate space, the position indication iBP is fixed even when the mobile terminal M1 is moved around as shown in FIGS. 5(a) and 5(b).

After field play begins and the user moves to the field 200, the user can execute an augmented reality image (which may be automatically executed) according to the shot guide by the mobile terminal and the ball position indication can appears on the augmented reality image iAR of the display screen.

If the ball position on the field and the user's position, that is, the location of the user's mobile terminal, are more than a certain distance from each other, the size of the ball position indication iBP on the augmented reality image iAR can be large to make it easier for the user to find their ball position. In addition, as the user moves and the ball position on the field and the user's position get closer, the size of the ball position indication iBP can be displayed gradually smaller. That is, the ball position indication iBP displayed on the augmented reality image iAR executed by the user's mobile terminal may be displayed larger as the distance between the ball position P1 on the field and the position of the M1 mobile terminal increases. In addition, as the user holds the M1 mobile terminal and approaches the ball position P1 on the field, the ball position indication iBP displayed on the augmented reality image iAR can be reduced.

Figure 6:
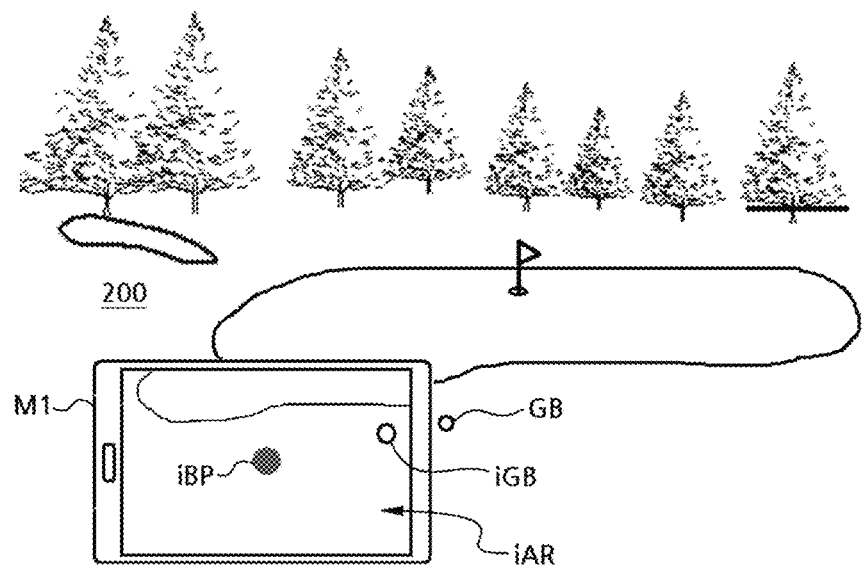
Figure 6:
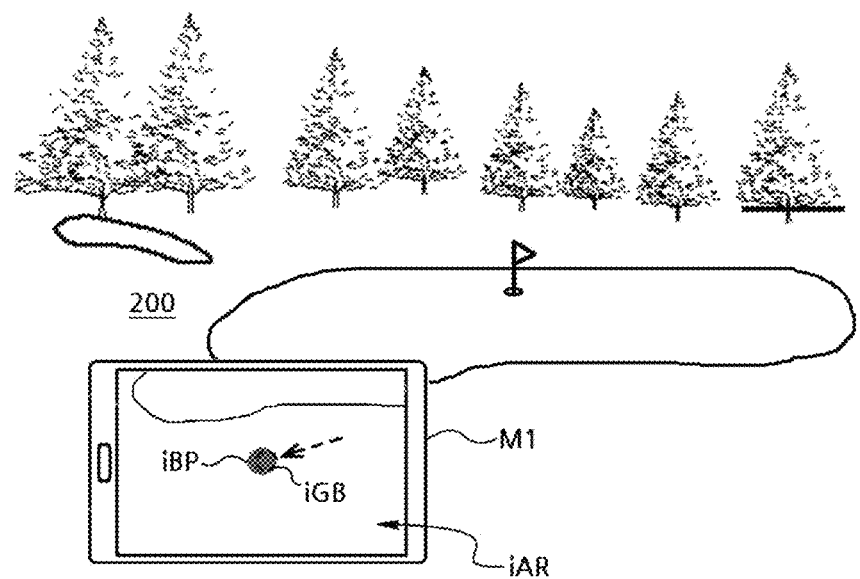

According to the user with M1 mobile terminal moves toward the ball position on the field and the user and the ball position on the field are somewhat closer, as shown in FIG. 6(a), when the user places the golf ball GB at an arbitrary position on the field and the golf ball GB is captured in the camera angle of the mobile terminal M1, the golf ball appears on the image iAR of augmented reality, and the mobile terminal M1 can recognize the golf ball as an object iGB on the image.

As the user moves the golf ball GB (the user may move the golf ball with the golf club or the user's foot), the mobile terminal M1 detects whether the recognized golf ball object iGB is located on the ball position indication iBP displayed on the augmented reality image, and the user can move the golf ball GB so that the golf ball object iGB is located on the ball position indication iBP while watching the augmented reality image iAR.

As shown in FIG. 6(b), when the golf ball object iGB on the augmented reality image is located on the ball position indication iBP according to moving the golf ball, it is determined that the golf ball GB is located on the ball position on the field and a ball ready on the field can occur.

The ball Ready on the field indicates that the golf ball is located on the ball position on the field and is ready for a golf shot. When the ball ready on the field occurs, the display image of the mobile terminal M1 can show an indication or blink indicating the ball ready on the field, and the user can see that the golf ball GB is located on the ball position on the field. The user may take a golf shot with respect to the golf ball placed in that position.

In this way, when playing field play, the user can accurately find a position to take a golf shot through the augmented reality using his/her mobile terminal and locate the golf ball on the position to take the golf shot.

As described above, if the field ball ready is made for the user of the M1 mobile terminal, it can be shared with other mobile terminals that the M1 mobile terminal has become the field ball ready. Wherein the user's mobile terminal in the next turn on the shot order can provide a shot guide and provide the user's ball position on the field as the ball position indication through the augmented reality image on the mobile terminal.

In the example shown in FIG. 4, since the P1 ball position has already been ball ready, the M3 mobile terminal provides the use for the next turn on the shot order with the shot guide for P3 ball position and displays the P3 ball position on the augmented reality image, and in the same way as the process for the field ball ready as described above, information is provided through the augmented reality image so that the user of the M3 mobile terminal can make the field ball ready at the P3 position.

After each of the users complete the ball ready on the field at each of the ball positions on the field and takes a golf shot, each user's hitting numbers can be detected by a separate sensing system installed around the field 200. When all users are holed out, the sensing system transmits each user's hitting numbers on the field to the simulator, and the simulator can calculate the score by adding the results played on the field and the results played on the virtual golf course.

Meanwhile, a description below is a method for locating a golf ball at a ball position on the field using the user's mobile terminal in the hybrid golf system according to an embodiment of the present invention with reference to FIGS. 7 and 8.

Figure 7:
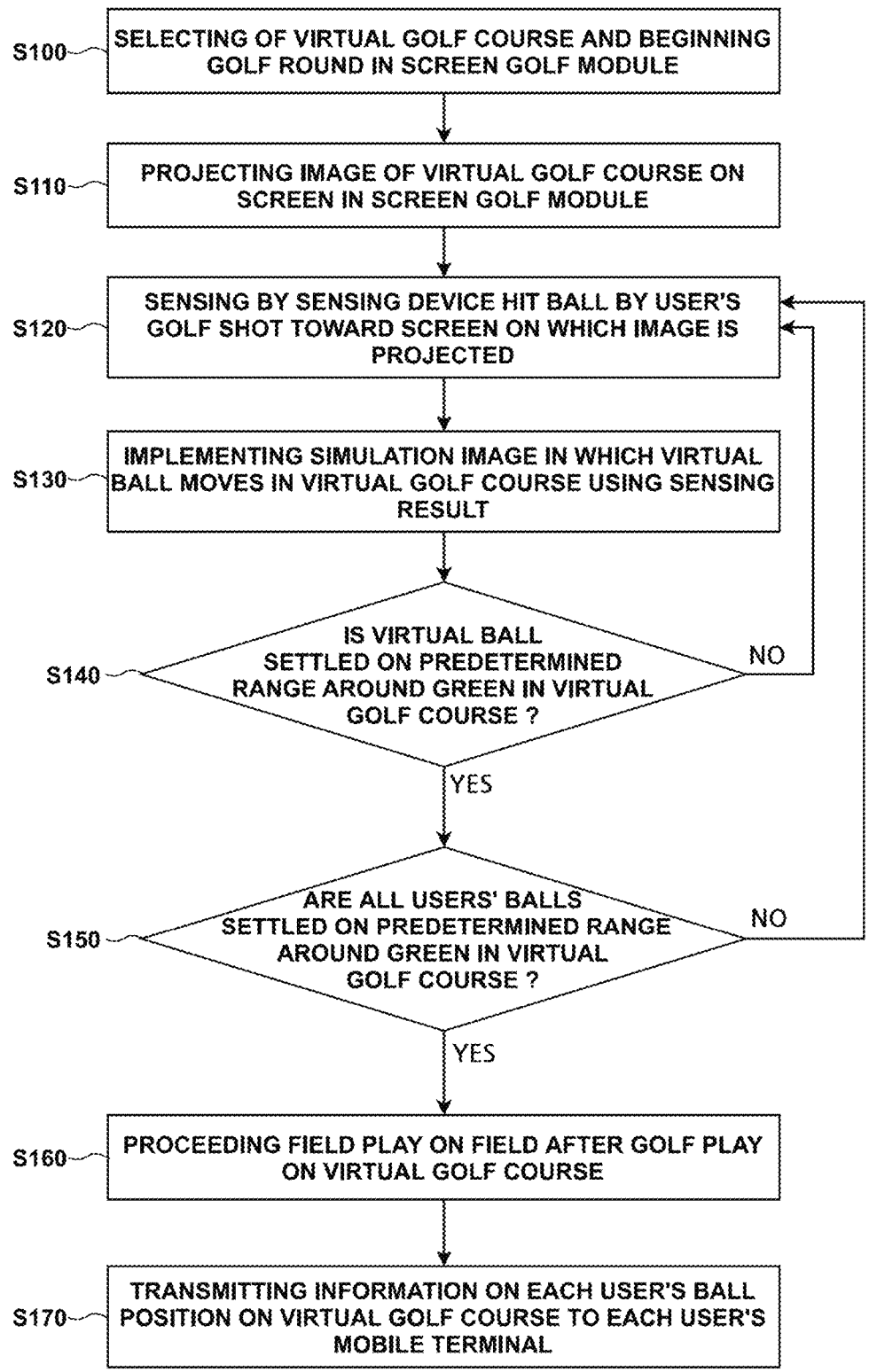
FIG. 7 and FIG. 8 show an example of process for placing a golf ball at a ball position on a field using a user's mobile terminal in a hybrid golf system according to an embodiment of the present invention.
Figure 8:
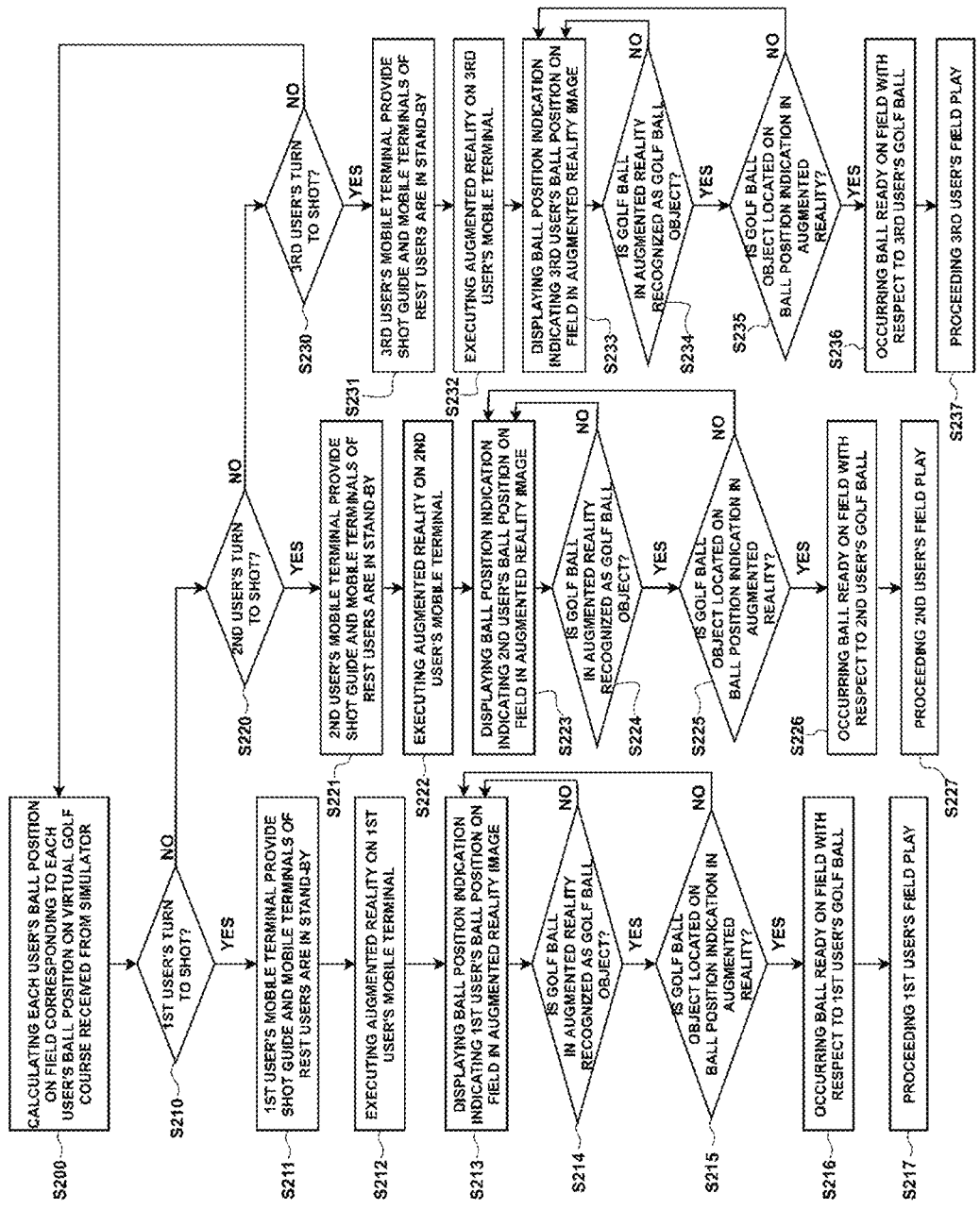

FIG. 7 is a part of a flowchart showing an example of process for placing a golf ball at a ball position on a field using a user's mobile terminal in a hybrid golf system according to an embodiment of the present invention, and FIG. 8 is the rest of the flowchart showing a method of positioning the golf ball at the ball position on the field using the user's mobile terminal following the flowchart of FIG. 7.

As shown in FIG. 7, first, a user selects a virtual golf course to play a golf round using a virtual golf simulation device within a screen golf module and starts a golf round (S100).

An image of the selected virtual golf course is projected on the screen (S110), and the sensing device senses the hit golf ball as the user takes a golf shot toward the screen (S120).

The simulator implements a simulation image in which a virtual ball moves on the virtual golf course using a sensing result of the sensing device (S130).

If the virtual ball is settled within a certain range around a green on the virtual golf course on the simulation image (S140), the simulator may confirm that all the user's virtual balls are settled within the certain range around the green on the virtual golf course (S150), then a field play on a field begins (S160).

As described above, as field play begins, the controller of the simulator transmits ball position information on each user's ball position on the virtual golf course to each user's mobile terminal (S170).

FIG. 8 shows a case in which each of the three users (first user, second user and third user) plays a field play using their own mobile terminals. Whether there are two, three, or four users, the method is all the same.

Following step S160 of FIG. 7, each user's mobile terminal may calculate the ball position on the field corresponding to the ball position on the virtual golf course of each transmitted user (S200).

First, in the case of the first user's shot order (S210), the first user's mobile terminal may provide a shot guide, and the remaining users' mobile terminals may be in shot waiting state (S211). The shot waiting may mean a guide for the mobile terminal to wait for another user to take a golf shot, or a deactivation of an augmented reality image.

After the first user's mobile terminal provided a shot guide in step S211, the first user's mobile terminal executes augmented reality (S212), and displays the first user's ball position on the field (ball position indication) on the executed augmented reality image (S213). This is shown in FIG. 5 and has been described, so further detailed descriptions will be omitted.

The first user can put the golf ball on the field, and the camera of the mobile terminal can capture the golf ball and recognize it as an object (S214).

If the mobile terminal recognizes a golf ball object, the user can move the golf ball while checking the ball position indication and the golf ball object on the augmented reality image of the mobile terminal, and the mobile terminal may detect whether the golf ball object is located at the ball position on the field (that is, the ball position indication) (S215).

When the golf ball object is located on the ball position indication in the augmented reality image of the mobile terminal, the field ball ready is made for the golf ball of the first user (S216), and the mobile terminal may inform the first user that the ball ready is made.

After the ball ready is made, the first user may perform the field play by hitting a golf ball placed at the ball position on the field (S217).

After the ball ready for the first user, the user's mobile terminal corresponding to the next shot order may provide the user with a shot guide.

That is, if the next user of the first user is the second user (S220), the second user's mobile terminal may provide the shot guide, and the remaining user's mobile terminal may wait for the shot (S221).

The second user's mobile terminal executes augmented reality (S222), and displays the ball position on the field (ball position indication) of the second user on the executed augmented reality image (S223).

The second user can put the golf ball on the field, and the camera of the mobile terminal can capture the golf ball and recognize it as an object (S224).

If the mobile terminal recognizes a golf ball object, the user can move the golf ball while checking the ball position indication and the golf ball object on the augmented reality image of the mobile terminal, and the mobile terminal can detect whether the golf ball object is located at the ball position on the field (that is, the ball position indication) (S225).

When the golf ball object is located on the ball position indication on the augmented reality image of the mobile terminal, the ball ready on the field is made for the golf ball of the second user (S226), and the mobile terminal may inform the second user that the ball ready is performed.

After the ball ready is performed, the second user may perform field play by hitting a golf ball placed at the position (S227).

If the second user's next turn is a third user (S230), the third user's mobile terminal may provide a shot guide, and the remaining users' mobile terminals may be in the shot waiting state (S231).

The third user's mobile terminal executes augmented reality (S232), and the third user's ball position on the field (ball position indication on the augmented reality) may be displayed on the executed augmented reality image (S233).

The third user can put the golf ball down at any position on the field, and the camera of the mobile terminal can capture the golf ball and recognize it as an object (S234).

After the mobile terminal recognizes the golf ball object, the third user can move the golf ball by checking the ball position indication and the golf ball object on the augmented reality image of the mobile terminal, and the mobile terminal can detect whether the golf ball object is located on the ball position indication (ball position on the field) (S235).

When the golf ball object is located on the ball position indication on the augmented reality image of the mobile terminal, a ball ready on the field occurs for the third user's golf ball (S236) and the mobile terminal alarms the ball ready on the field.

After the ball ready on the field, the third user may perform field play by hitting the golf ball placed at the ball position on the field (S237).

As described above, a hybrid golf system, a control method of a mobile terminal used to the same and a method for locating a golf ball at a ball position on a field using a user's mobile terminal in the hybrid golf system according to the present invention have an advantageous effect in that it is possible to allow the user to find a golf ball position on an actual field corresponding to a virtual ball position on a virtual golf course using the user's mobile terminal without additional devices for pointing the golf ball position.

INDUSTRIAL APPLICABILITY

A hybrid golf system, a control method of a mobile terminal used to the same and a method for locating a golf ball at a ball position on a field using a user's mobile terminal in the hybrid golf system according to the present invention are applicable to industries related to a golf analysis and industries related to a virtual golf simulation system based on an analysis of the movement of a golf club during golf swing.

The invention claimed is:

1. A method for locating a golf ball at a ball position on a field using a user's mobile terminal in a hybrid golf system including a field provided for the user to play golf and a screen golf module provided on one side of the field to play golf on a virtual golf course, the method comprising:
transmitting by a simulator in the screen golf module, information on the user's ball position on the virtual golf course according to the golf play in the screen golf module to the user's mobile terminal;
displaying a ball position indication indicating the ball position on the field corresponding to the user's ball position on the virtual golf course on a augmented reality image executed by the user's mobile terminal; and
locating an object of the golf ball on the ball position indication on the augmented reality image of the user's mobile terminal so that a ball ready on the field occurs, indicating that the golf ball is located at the user's ball position on the field.

2. The method according to claim 1, wherein the transmitting information to the user's mobile terminal includes transmitting ball position information on the virtual golf course of each of a plurality of users to each of the mobile terminals of the plurality of the users, and
wherein the displaying the ball position on the field includes:
calculating by each of the mobile terminals, ball positions on the field corresponding to each of the users' ball positions on the virtual golf course;
providing by each of the users' mobile terminals, a shot guide to each of the users when each of the users becomes a shot order of each user; and
displaying a ball position indication indicating the user's ball position on the field on the augmented reality image of the mobile terminal provided the shot guide.

3. The method according to claim 1, wherein the displaying the ball position on the field includes:
calculating by the mobile terminals, the ball position on the field corresponding to the users' ball positions on the virtual golf course; and
displaying a ball position indication indicating the ball position on the field on the augmented reality image executed by the mobile terminal using position information calculated by a GPS module of the mobile terminal and information of the ball position on the field.

4. The method according to claim 1, wherein the displaying the ball position on the field includes displaying the ball position indication on the augmented reality image larger as the distance between the ball position on the field and the mobile terminal's position is further, as the user holds the mobile terminal and approaches the ball position on the field, the ball position indication on the augmented reality image is gradually reduced.

5. The method according to claim 1, wherein the locating an object of the golf ball on the ball position indication includes:
capturing the golf ball placed at an arbitrary position on the field in an angle of view of a camera of the mobile terminal in the state of displaying the ball position indication indicating the ball position on the field on the augmented reality of the mobile terminal;
recognizing an object of the captured golf ball by the mobile terminal;
detecting by the mobile terminal, whether the golf ball object is located on the ball position indication in the augmented reality image as the user moves the golf ball; and
occurring a ball ready on the field when the golf ball object is located on the ball position indication in the augmented reality image.

6. A control method of a mobile terminal used to a hybrid golf system including a field provided for the user to play golf and a screen golf module provided on one side of the field to play golf on a virtual golf course, the control method comprising:
receiving a user's ball position on a virtual golf course according to the user's golf play in the screen golf module;

calculating a ball position on the field corresponding to the received ball position on the virtual golf course;

executing an augmented reality image and displaying a ball position indication indicating the ball position on the field in the augmented reality image; and recognizing a golf ball on the field as an object of the golf ball, and occurring a ball ready on the field that determines that the golf ball is located on the ball position on the field when the recognized golf ball object is located on the ball position indication displayed in the augmented reality image.

7. The control method according to claim 6, wherein the displaying the ball position indication in the augmented reality image includes:

providing a shot guide when the user owned the mobile terminal becomes a shot order; and displaying the ball position indication indicating the ball position on the field on the augmented reality image executed by the mobile terminal using position information calculated by a GPS module of the mobile terminal and information of the ball position on the field.

8. A hybrid golf system comprising:

a screen golf module provided on one side of a field where a user can play golf and allowing the user to play golf on a virtual golf course;

a simulator provided in the screen golf module and implementing an image of a virtual golf simulation on the virtual golf course; and a mobile terminal that is configured to:

receive a user's ball position on the virtual golf course according to the user's golf play in the screen golf module, calculate a ball position on the field corresponding to the received ball position on the virtual golf course, execute an augmented reality image and displaying a ball position indication indicating the ball position on the field in the augmented reality image, recognize a golf ball on the field as an object of the golf ball, and occur a ball ready on the field that determines that the golf ball is located on the ball position on the field when the recognized golf ball object is located on the ball position indication displayed in the augmented reality image.

\* \* \* \* \*